United States Patent
Shao et al.

(10) Patent No.: US 12,368,169 B2
(45) Date of Patent: Jul. 22, 2025

(54) DURABLE HYBRID ELECTROCATALYSTS FOR FUEL CELLS

(71) Applicant: The Hong Kong University of Science and Technology, Hong Kong (CN)

(72) Inventors: Minhua Shao, Hong Kong (CN); Fei Xiao, Hong Kong (CN)

(73) Assignee: The Hong Kong University of Science and Technology, Hong Kong (CN)

(*) Notice: Subject to any disclaimer, the term of this patent is extended or adjusted under 35 U.S.C. 154(b) by 430 days.

(21) Appl. No.: 17/760,010

(22) PCT Filed: Feb. 7, 2020

(86) PCT No.: PCT/IB2020/000101
§ 371 (c)(1),
(2) Date: Aug. 3, 2022

(87) PCT Pub. No.: WO2021/156644
PCT Pub. Date: Aug. 12, 2021

(65) Prior Publication Data
US 2023/0068441 A1 Mar. 2, 2023

(51) Int. Cl.
*H01M 4/92* (2006.01)
*H01M 4/88* (2006.01)

(52) U.S. Cl.
CPC ......... *H01M 4/921* (2013.01); *H01M 4/8828* (2013.01); *H01M 4/8882* (2013.01); *H01M 4/926* (2013.01)

(58) Field of Classification Search
CPC ... B01J 21/18; B01J 23/42; B01J 23/75; B01J 23/8906; B01J 23/8913; B01J 23/8986;
(Continued)

(56) References Cited

U.S. PATENT DOCUMENTS 6,287,717 B1 * 9/2001 Cavalca ............ H01M 8/1004
429/492
8,709,295 B2 4/2014 Zelenay et al.
(Continued)

FOREIGN PATENT DOCUMENTS

CN 108682870 A 10/2018
CN 109046427 A 12/2018
(Continued)

OTHER PUBLICATIONS

Supporting Information for "Single-Atom to Single-Atom Grafting of Pt1 onto Fe—N4-Center: Pt1@Fe—N—C Multifunctional Electrocatalyst with Significantly Enhanced Properties," by Xiaojun Zeng et al. (Applicants' submitted art). (Year: 2017).*
(Continued)

*Primary Examiner* — Patricia L. Hailey
(74) *Attorney, Agent, or Firm* — Saliwanchik, Lloyd & Eisenschenk (57) ABSTRACT

Electrocatalysts and methods of forming the same are provided. A hybrid electrocatalyst can be a combination of a platinum (Pt)-based catalyst and a carbon-based non-precious-metal catalyst using a single atom approach. A fuel cell electrocatalyst can include a nitrogen-doped carbon support and a plurality of atoms of both Pt and of a non-precious-metal catalyst dispersed in the support. The dispersed atoms can be isolated from each other within the support.

18 Claims, 4 Drawing Sheets

(58) Field of Classification Search
CPC .... B01J 20/226; H01M 4/921; H01M 4/8828; H01M 4/8882; H01M 4/926
USPC .......... 502/185; 429/524; 420/482, 435, 466
See application file for complete search history.

(56) References Cited

U.S. PATENT DOCUMENTS

| | | | |
|---|---|---|---|
| 2011/0207019 A1* | 8/2011 | Mukerjee | H01M 8/086 977/840 |
| 2011/0294658 A1 | 12/2011 | Lefevre et al. | |
| 2012/0046161 A1* | 2/2012 | Ball | C22C 1/11 502/185 |
| 2012/0238440 A1* | 9/2012 | Gu | H01M 4/90 977/774 |
| 2014/0099571 A1 | 4/2014 | Proietti et al. | |
| 2017/0263945 A1 | 9/2017 | Li et al. | |
| 2019/0245233 A1 | 8/2019 | Pintauro et al. | |

FOREIGN PATENT DOCUMENTS

| | | |
|---|---|---|
| CN | 110114918 A | 8/2019 |
| JP | 2006-511927 A | 4/2006 |
| JP | 2007-273371 A | 10/2007 |
| JP | 2008-171659 A | 7/2008 |
| JP | 2010-506822 A | 3/2010 |
| WO | 2015/141595 A1 | 9/2015 |

OTHER PUBLICATIONS

Shi, X., et al., "Pt-Co@NCNTs cathode catalyst using ZIF-67 for proton exchange membrane fuel cell," International Journal of Hydrogen Energy, 2018, 43:3520-3526.

Zeng, X., et al., "Single-Atom to Single-Atom Grafting of Pt1 onto Fe—N4 Center: Pt1@Fe—N—C Multifunctional Electrocatalyst with Significantly Enhanced Properties," Advanced Energy Materials, 2017, 8:1-16.

International Search Report dated Nov. 17, 2020 in International Application No. PCT/IB2020/000101.

Office Action dated Jan. 9, 2024 in Japanese Application No. 2022-546406.

* cited by examiner

DURABLE HYBRID ELECTROCATALYSTS FOR FUEL CELLS

CROSS-REFERENCE TO RELATED APPLICATION

This application is the U.S. national stage application of International Patent Application No. PCT/IB2020/000101, filed Feb. 7, 2020, the disclosure of which is incorporated herein by reference in its entirety.

BACKGROUND OF THE INVENTION

Proton exchange membrane fuel cells (PEMFCs) have gained considerable attention as clean energy conversion devices with high efficiency and little to no environmental pollution. However, it is still a great challenge to achieve widespread commercialization of PEMFC technology due to high material cost and low durability. Because the reaction rate of the oxygen reduction reaction (ORR) at the cathode is six orders of magnitude slower than the hydroghen oxidation reaction (HOR) in the anode, higher platinum (Pt) loading (e.g., about 0.4 milligrams of Pt per square centimeter ($mg_{pt}/cm^2$) in the cathode is essential in existing technologies in order to achieve reasonably good performance. Pt is a scarce and expensive metal (cost of over $850 (USD) per ounce in 2019). Thus, more active and less expensive ORR electrocatalysts than Pt are desired.

The ORR activity improvement for Pt alloy catalysts is mainly due to electronic and compressive strain effects from the transition metals. Fuel cell testing shows that the Pt mass activity of Pt alloys is about 2 times that of Pt, which enables the reduction of Pt loading from about 0.4 $mg/cm^2$ to 0.2 $mg/cm^2$. However, only surface atoms participate in the electrochemical reactions, so more than 70% of the Pt atoms are wasted inside the nanoparticles for both Pt and Pt alloy.

Despite the significant progress achieved in carbon-based non-precious metal (NPM) catalyst development, the undesirable durability (only a few hundreds of hours) is still far from the target of 5,000 hours by 2025. For typical NPM catalysts, Fe—N—C generates more $H_2O_2$ than Pt-based catalysts, which is undesirable as it not only oxidizes and destroys active sites in catalysts but also causes the radical oxidative degradation of the membrane and Nafion ionomers. Another reason is that the thick catalyst layer of Fe—N—C poses a serious challenge to oxygen mass transport and water management.

Previous attempts to improve the Fe—N—C catalyst have been made. U.S. Patent Application Publication No. U.S. 2014/0099571 (Proietti et al.) uses a Fe—N—C catalyst by using zeolite imidazole framework-8 (ZIF-8) as a thermally decomposable porous support to mix with 1,10-phenanthroline and ferrous acetate. U.S. Patent Application Publication No. 2011/0294658 (Lefevre et al) uses Fe—N—C via different microporous supports and iron-based precursors along with the help of a pore-filler. U.S. Pat. No. 8,709,295 (Zelenay et al.) uses an Fe—Co hybrid catalyst by polymerizing an aniline in the presence of a cobalt-containing catalyst support and an iron-containing compound to form cobalt-containing, iron-bound polyaniline species.

BRIEF SUMMARY OF THE INVENTION

Embodiments of the subject invention provide novel and advantageous electrocatalysts, methods of forming the same, and methods of using the same. A hybrid electrocatalyst can be a combination of a platinum (Pt)-based catalyst and a carbon-based non-precious-metal catalyst using a single atom approach. This hybrid structure reduces the cost and improves the activity of the catalysts, while also enhancing the durability of fuel cells. Using a non-precious metal (e.g., iron (Fe), cobalt (Co), manganese (Mn)) to replace some of the Pt in the electrocatalyst can significantly reduce the Pt loading in the cathode and realize the target of 0.1 milligrams of Pt per square centimeter ($mg_{Pt}/cm^2$) or lower. At the same time, the synergistic effect between Pt, a non-precious metal-catalyst (e.g., Fe, Co, Mn), and nitrogen (N) can promote electron transfer and minimize the generation of $H_2O_2$. In addition, due to the increased density of active sites in the hybrid structure as compared with conventional Fe—N—C catalysts, thinner catalyst layers with improved volumetric activity can be fabricated to solve the mass transfer and internal resistance issues. While membrane electrode assembly (MEA) optimization techniques developed over a number of years for Pt-based catalyst layers are unsuitable for conventional non-precious-metal catalysts because the layer is too thick, such techniques can be applicable for hybrid electrocatalysts of embodiments of the subject invention.

In an embodiment, a fuel cell electrocatalyst can comprise: a support comprising carbon; a plurality of atoms of a first catalyst uniformly dispersed in a framework of the support such that each atom of the first catalyst within the framework is isolated from each other atom of the first catalyst within the framework; and a plurality of atoms of a second catalyst uniformly dispersed in the framework of the support such that each atom of the second catalyst within the framework is isolated from each other atom of the second catalyst within the framework; wherein the first catalyst is a non-precious metal; and wherein the second catalyst is a precious metal. The second catalyst can be Pt, and the first catalyst can be Fe. The carbon of the support can be doped with N, such that N atoms are present within the framework of the support. At least a portion (e.g., some or all) of the plurality of atoms of the first catalyst within the framework can be respectively bonded to N atoms within the framework, and at least a portion (e.g., some or all) of the plurality of atoms of the second catalyst within the framework can be respectively bonded to N atoms within the framework. Nanoparticles of an alloy of the first catalyst and the second catalyst can be present. All of the atoms of the first catalyst within the framework and/or all of the atoms of the second catalyst within the framework can be present at a first surface of the support.

In another embodiment, a method of forming a fuel cell electrocatalyst can comprise: forming a porous support comprising carbon and a first catalyst (e.g., Fe, Co, Mn); and introducing a second catalyst (e.g., Pt) to the porous support to form the fuel cell electrocatalyst, such that a plurality of atoms of the second catalyst are uniformly dispersed in a framework of the support such that each atom of the second catalyst within the framework is isolated from each other atom of the second catalyst within the framework. The formed fuel cell electrocatalyst can have any of the features disclosed herein. The forming of the porous support can comprise: dissolving an organic compound in a first solvent to form a first solution; dissolving a compound having the first catalyst in a second solvent to form a second solution; mixing the first solution and the second solution to form a first mixture; stirring the first mixture to form a suspension; collecting the suspension; drying the suspension to give a dried suspension; and heat-treating the dried suspension to give the porous support. The introducing of the second catalyst to the porous support to form the fuel cell electrocatalyst can comprise: homogeneously dispersing a second-catalyst-containing material in a fourth solvent to form a third solution; adding a fourth solution to the third solution to form a fifth solution; adding the porous support to the fifth solution to form a second-catalyst-containing suspension; drying the second-catalyst-containing suspension to give a dried second-catalyst-containing suspension; ball milling the dried second-catalyst-containing suspension to give a milled second-catalyst-containing suspension; and heat-treating the milled second-catalyst-containing suspension to give the fuel cell electrocatalyst. In a further embodiment, the heat-treating of the milled second-catalyst-containing suspension can comprise: performing a first heat treatment on the milled second-catalyst-containing suspension in an $NH_3$ atmosphere; and performing a second heat treatment on the milled second-catalyst-containing suspension in an inert atmosphere after the first heat treatment.

DETAILED DISCLOSURE OF THE INVENTION

Embodiments of the subject invention provide novel and advantageous electrocatalysts, methods of forming the same, and methods of using the same. A hybrid electrocatalyst can be a combination of a Pt-based catalyst and a carbon-based non-precious-metal (NPM) catalyst using a single atom approach. This hybrid structure reduces the cost and improves the activity of the catalysts, while also enhancing the durability of fuel cells. Using an NPM (e.g., Fe, Co, Mn) to replace some of the Pt in the electrocatalyst can significantly reduce the Pt loading in the cathode and realize the target of 0.1 milligrams of Pt per square centimeter ($mg_{Pt}/cm^2$) or lower. At the same time, the synergistic effect between Pt, an NPM catalyst (e.g., Fe, Co, Mn), and N can promote electron transfer and minimize the generation of $H_2O_2$. In addition, due to the increased density of active sites in the hybrid structure as compared with conventional Fe—N—C catalysts, thinner catalyst layers with improved volumetric activity can be fabricated to solve the mass transfer and internal resistance issues. While membrane electrode assembly (MEA) optimization techniques developed over a number of years for Pt-based catalyst layers are unsuitable for conventional non-precious-metal catalysts because the layer is too thick, such techniques can be applicable for hybrid electrocatalysts of embodiments of the subject invention.

Figure 6:
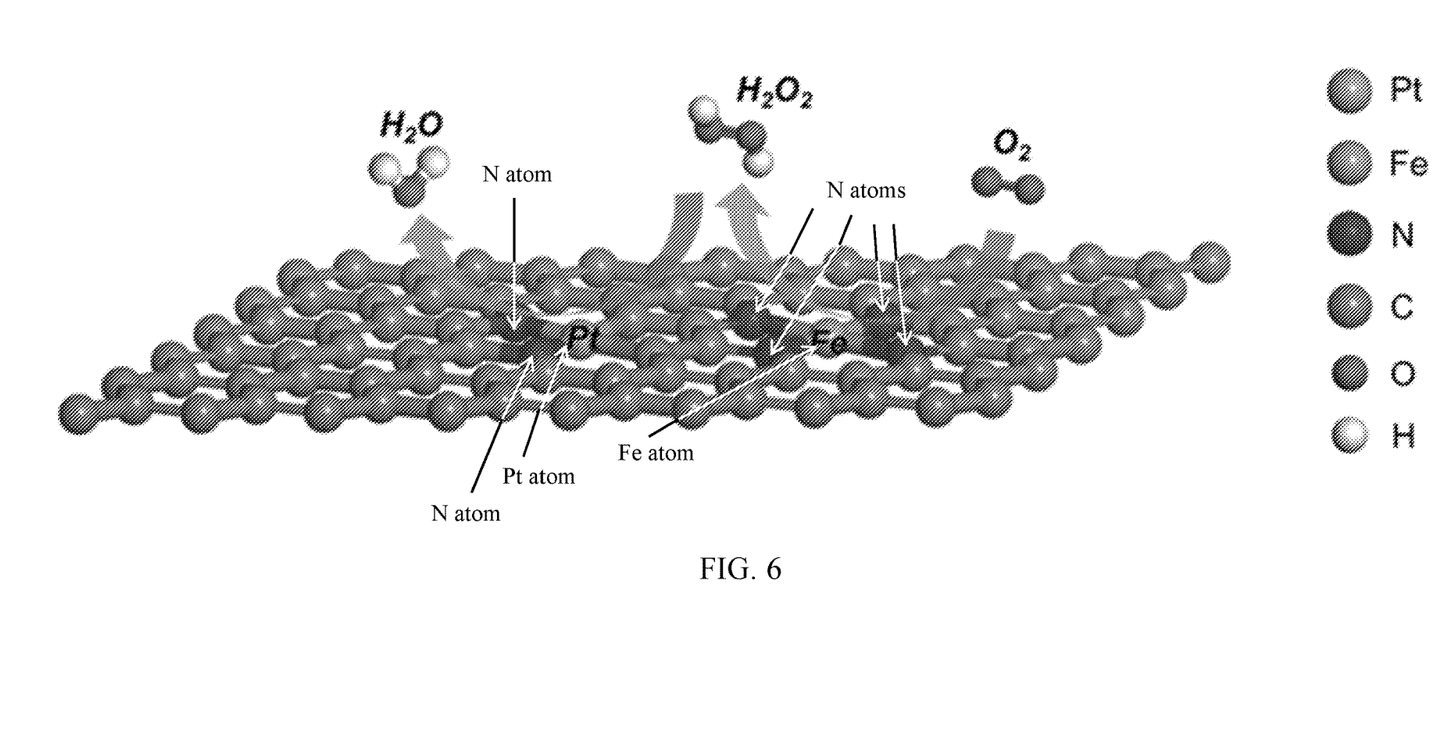
FIG. 6 is schematic view showing a hybrid electrocatalyst according to an embodiment of the subject invention. The catalyst can include Pt and Fe isolated atoms in a carbon matrix, and $H_2O_2$ can be reduced to $H_2O$ on a Pt isolated atom. The $H_2O$ can be generated on the Fe—N—C (e.g., from $O_2$).

Because of the challenges posed by Fe—N—C catalysts, there is a need in the art for reducing $H_2O_2$ formation and further improving oxygen reduction reaction (ORR) activity to reduce the thickness of the electrode. In order to address issues of low Pt utilization for Pt-based catalysts and unsatisfactory activity and stability for non-precious catalysts (e.g., Fe—N—C), embodiments of the subject invention utilize hybrid ORR electrocatalysts with Pt and Fe single atoms (i.e., isolated atoms) homogeneously dispersed on a support (e.g., a carbon support, such as a nitrogen-doped carbon support). FIG. 6 is schematic view showing a hybrid electrocatalyst according to an embodiment of the subject invention. The catalyst can include Pt and Fe isolated atoms in a carbon matrix, and $H_2O_2$ can be reduced to $H_2O$ on a Pt isolated atom. The $H_2O$ can be generated on the Fe—N—C (e.g., from $O_2$). Compared to related art catalysts in U.S. Patent Application Publication No. U.S. 2014/0099571, U.S. Patent Application Publication No. 2011/0294658, and U.S. Pat. No. 8,709,295, hybrid electrocatalysts of embodiments of the subject invention can Fe—N—C with homogeneously dispersed single atoms as the porous support to the secondary Pt introduction. Fe, Pt, and N synergistically work together to promote ORR kinetics, and Pt also promotes durability of the electrocatalyst.

Referring again to FIG. 6, nitrogen can efficiently anchor Pt and Fe single atoms by forming Pt—N and Fe—N bonds, respectively. Fe and Pt multi-dopants can synergistically work together to promote ORR kinetics. In this hybrid structure, the most active non-precious metal catalysts (Fe—N—C) can be combined with Pt single atoms to optimize the Pt mass activity by maximizing Pt utilization. In addition, $H_2O_2$ generated at Fe—N—C sites can be significantly reduced to $H_2O$ by the adjacent Pt active sites, as shown in FIG. 6. Thus, both the activity and durability of the electrocatalyst is significantly enhanced. It should be noted that, while FIG. 6 shows only one atom each of Pt and Fe, this is for exemplary purposes, and there would actually be a large number of both types of atoms. The use of the term "single" atoms is to convey that they are isolated within the support from other atoms of the same type.

Heterogeneous catalysts with Pt have been used with carbon monoxide oxidation, selective electrochemical reactions, and hydrogen evolution reactions. Related art methods do not consider the durability of Pt-atom catalysts in a harsh acid electrolyte. Also, the ORR pathway mainly depends on the type of dopant in the support; for example, Pt dispersed on a sulfur-doped support (Pt—S bonds) favor ORR in a two-electron reaction pathway to produce $H_2O_2$. In many embodiments of the subject invention, single Fe atoms can be dispersed on a support with excess nitrogen sources, and then Pt single atoms can be introduced. The impregnation method can be, for example, that used by Zhang et al. (The Simplest Construction of Single-Site Catalysts by the Synergism of Micropore Trapping and Nitrogen Anchoring. Nat. Commun. 2019, 10 (1), 1657; which is hereby incorporated by reference herein in its entirety). In order to make Pt sources more uniformly distributed on the support, ball milling can then be applied. In addition, heat treatment at a high temperature can be performed and can stabilize Pt single atoms in the support and also promote the formation of strong Pt—N bonds. The hybrid structures of embodiments of the subject invention promote the performance and durability of the electrocatalyst to catalytic ORR via a four-electron pathway.

In an embodiment, non-precious-metal catalyst atoms (e.g., Fe atoms) can be uniformly dispersed in N-doped carbon to create a non-precious-metal-having support that can be further used as the support for Pt single atoms. Transition metal and nitrogen doping in carbon are difficult to control precisely during the pyrolysis step due to aggregation, resulting in a low density of active sites. Other compounds, such as Fe particles, sulfides, and carbides that are less active for ORR can be generated as by-products during pyrolysis. Thus, metal organic frameworks (MOFs) can be used as the templates for the support due to their low cost and simple synthesis procedure. An organic compound (e.g., 2-methylimidazole) can be dissolved in a first solvent (e.g., methanol) to form a first solution, and a compound having the non-precious metal (e.g., $Zn(NO)_3 \cdot 6H_2O$ and/or $FeSO_4 \cdot 6H_2O$) can be dissolved in a second solvent, which can be the same as or different from the first solvent, to form a second solution. The first and second solvents can be in separate containers. The first and second solutions can be mixed uniformly (e.g., after bubbling in an inert atmosphere (e.g., in Ar for 1 hour (h))) to form a mixture. Then, the mixture can be stirred (e.g., under an inert atmosphere, such as under the protection of Ar at 40° C. for 10 h) to form a suspension. The suspension can be collected (e.g., by centrifugation) and then optionally washed with a third solvent (e.g., absolute ethanol) one or more (e.g., several) times to give a first intermediate product. The first intermediate product can be dried in a vacuum atmosphere (e.g., at 80° C. in a vacuum oven for 12 h) to give a second intermediate product. The second intermediate product can be heat-treated (e.g., in an inert atmosphere, such as in an Ar atmosphere at 1000° C. for 1 h) to give a final product that is a non-precious-metal-having support (e.g., Fe—N—C support).

Pt single atoms can be introduced to the non-precious-metal-having support (e.g., Fe—N—C support) via an impregnation method with optional ball-milling. The non-precious metal and the Pt can be introduced in separate steps to maximize their densities in the hybrid catalyst. For example, if Pt and Fe are mixed into an MOF at the same time, they compete for desirable anchoring sites and also form Pt—Fe alloy particles. A platinum compound (e.g., platinum (II) acetylacetonate) can be homogeneously dispersed in a solvent to form a Pt solution. A nitrogen-containing solution (e.g., 1,10-phenanthroline monohydrochloride monohydrate ethanol solution) can be added to the Pt solution to form a Pt/N solution. The non-precious-metal-having support (e.g., a powder of the non-precious-metal-having support, such as a Fe—N—C powder) can be dispersed in the Pt/N solution to form a suspension (e.g., a uniform suspension). The suspension can be dried in a vacuum atmosphere (e.g., dried at 60° C. in the vacuum oven for 12 h) to give a solid, and the solid can be collected. The solid can then be ball milled (e.g., with a metal-containing ball mill, such as an aluminum-containing ball mill (e.g., $Al_2O_3$ ball, 350 rpm, 4 h)) to uniformly disperse the Pt and N sources on the non-precious-metal-having support to give a powder. The solid/powder can be heat-treated (e.g., in an inert atmosphere, such as in Ar gas at 900° C. for 1 h) to stabilize Pt and non-precious-metal-catalyst single atoms. This results in uniformly-dispersed single atoms of Pt and the non-precious metal (e.g., Fe), as seen in FIG. 6 (as discussed above, while FIG. 6 shows only one atom each of Pt and Fe, this is for exemplary purposes, as there would actually be a large number of both types of atoms and the use of the term "single" atoms is to convey that they are isolated within the support from other atoms of the same type).

In a further embodiment, the solid/powder can be first heat-treated in an $NH_3$ atmosphere (e.g., in $NH_3$ gas at 900° C. for 15 min) and then heat-treated again (e.g., in an inert atmosphere, such as an Ar atmosphere at 1000° C. for 1 h). After heat treatment, the resulting solid can be washed (e.g., acid washed, such as in 0.5 M $H_2SO_4$, 60° C. for 2 h) and then optionally heat treated again in an inert atmosphere (e.g., in Ar atmosphere at 1000° C. for 1 h). $NH_3$ can play an important role in increasing the ORR activity of Fe—N—C during heat treatment, so the $NH_3$-atmosphere heat treatment can be performed to further improve the ORR activity of electrocatalysts of embodiments of the subject invention. This can etch the carbon according to the reactions: $C+NH_3 \rightarrow HCN+H_2$, and $C+2H_2 \rightarrow CH_4$, and removing some of the carbon support can result in an increase in both the Pt and non-precious-metal catalyst (e.g., Fe) loading. In addition, some active sites that are covered by a carbon film formed on the first heat treatment may be exposed after such etching.

Following are examples that illustrate procedures for practicing the invention. These examples should not be construed as limiting. All percentages are by weight and all solvent mixture proportions are by volume unless otherwise noted.

Example 1—Preparation of Fe-ZIF-8 and Fe—N—C Templates

A support having Fe and N was prepared as a precursor to which platinum could then be added. A general protocol to synthesize Fe single atoms uniformly dispersed in N-doped carbon was used. Transition metal and nitrogen doping in carbon are difficult to control precisely during the pyrolysis step due to aggregation, which can result in a low density of active sites. Other compounds, such as Fe particles, sulfides, and carbides that are less active for ORR can be generated as by-products during pyrolysis. To solve this problem, metal organic frameworks (MOFs) can be used as the self-templates due to their low cost and simple synthesis procedure. The detailed synthesis steps were as follows.

- 8.21 grams (g) of 2-methylimidazole was dissolved in 200 milliliters (ml) of methanol in a flask to give a first solution. 282.6 milligrams (mg) of $Zn(NO)_3 \cdot 6H_2O$ and 14 mg of $FeSO_4 \cdot 6H_2O$ were dissolved in 100 ml of methanol in another flask to give a second solution.
- The two solutions were mixed uniformly after bubbling in argon (Ar) for 1 hour (h). Then, the mixture was stirred under the protection of Ar at 40° C. for 10 h.
- The suspension was collected by centrifugation and then washed with absolute ethanol several times. The product was dried at 80° C. in a vacuum oven for 12 h (denoted as Fe-ZIF-8).
- Then, the product was heat-treated in the Ar atmosphere at 1000° C. for 1 h (denoted as Fe—N—C).

Figure 1A:
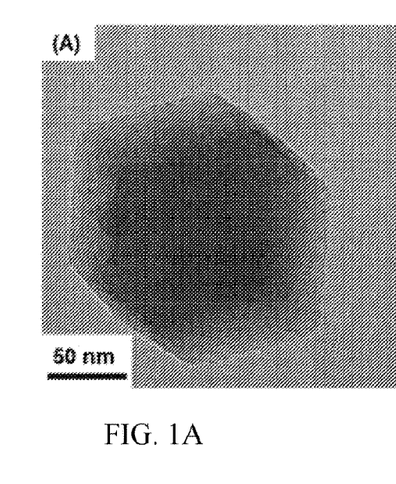
FIG. 1A is a transmission electron microscope (TEM) image of an iron zeolite imidazole framework-8 (Fe-ZIF-8) precursor with a polyhedron shape.
Figure 1B:
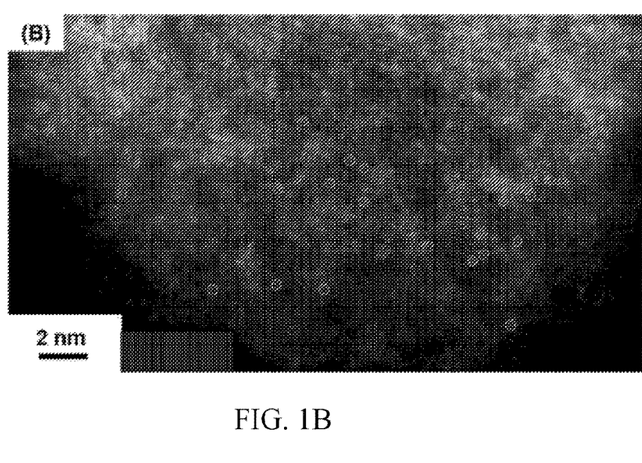
FIG. 1B is a high-angle annular dark-field STEM (HAADF-STEM) image of homogeneous dispersed iron (Fe) single atoms, seen as white dots (and partially indicated with circles added to the image).
Figure 1C:
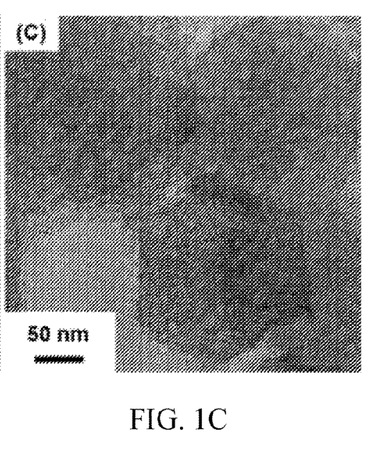
FIG. 1C is a TEM image for a porous carbon framework derived from the Fe-ZIF-8 precursor of FIG. 1A.

The results demonstrated the success of Fe single atom formation. Zn, Fe, and 2-methylimidazole in the methanol solvent formed well-defined Fe-ZIF-8 precursors (see FIG. 1A) with polyhedron shapes. The sublimation of Zn at high temperature (>907° C.) during pyrolysis left only dispersed Fe atoms (see FIG. 1B) in the porous N-doped carbon framework (see FIG. 1C).

Example 2—Preparation of Pt—Fe—N—C Hybrid Catalyst

Pt single atoms were introduced into the optimized Fe—N—C support from Example 1 via impregnation and ball-milling method. The reason for introducing Fe and Pt in separate steps is to maximize their densities in the hybrid catalyst. If Pt and Fe are mixed into the MOF at the same time, they can compete for the desirable anchoring sites and also form Pt—Fe alloy particles. In the synthesis of the Fe—N—C support (Example 1), the Fe doping was realized by replacing Zn in a MOF. The defined MOF structure, along with the confinement effect from a "Zn fence", reduces the mobility of Fe during the high-temperature pyrolysis. However, it is much more difficult to dope Pt single atoms uniformly in this impregnation step. This problem was addressed by taking advantage of the hierarchical porous structure in the Fe—N—C support. The detailed synthesis steps were as follows.

- 10 mg of platinum (II) acetylacetonate was homogeneously dispersed in an ethanol solvent forming a 5 millimolar (mM) solution by sonication.
- Then, 1,10-phenanthroline monohydrochloride monohydrate ethanol solution (5.5 grams per liter (g/L)) was added in the Pt solution (e.g., to provide enough nitrogen source for Pt coordination).
- 400 mg of Fe—N—C powder was dispersed in the above solution to form a uniform suspension.
- After the mixture drying at 60° C. in the vacuum oven for 12 h, the solid was collected and ball milled (using an $Al_2O_3$ ball, 350 revolutions per minute (rpm), 4 h) to uniformly disperse the Pt and N sources on the Fe—N—C support.
- The powder after ball milling was treated with Ar gas at 900° C. for 1 h to stabilize Pt and Fe single atoms.

Figure 2A:
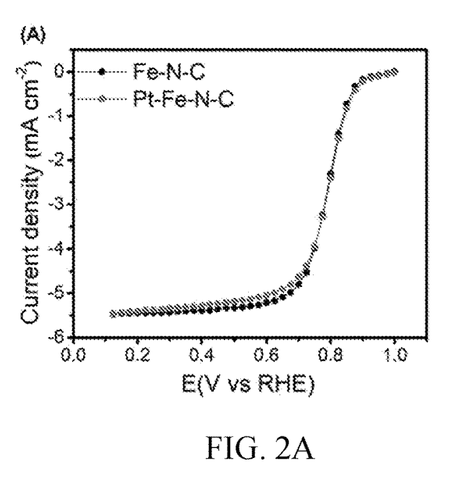
FIG. 2A is a plot of current density (in milliamps per square centimeter ($mA/cm^2$)) versus potential (in Volts with reference to a reversible hydrogen electrode (V vs RHE)), providing the steady-state polarization curves of oxygen reduction reaction (ORR) activity for Fe-N—C and for Pt—Fe—N—C. The catalyst loading for both Fe—N—C and Pt—Fe—N—C was 0.56 milligrams per square centimeter ($mg/cm^2$). The curve that is closer to the x-axis at 0.6 V is for Fe—N—C, and the other curve is for Pt—Fe—N—C.
Figure 2B:
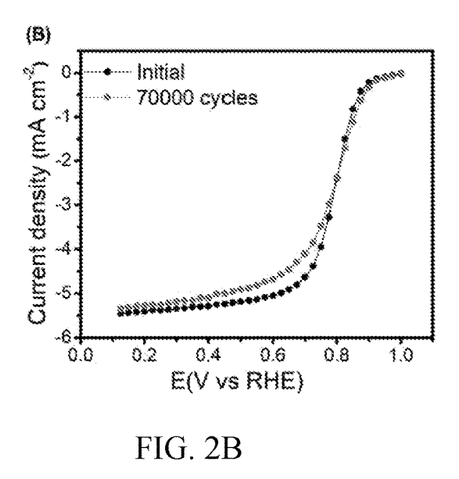
FIG. 2B is a plot of current density (in $mA/cm^2$) versus potential (in V vs RHE), providing the steady-state polarization curves of ORR activity for Pt—Fe—N—C initially and after 70,000 cycles in 0.1 M $HClO_4$ electrolyte. The catalyst loadings were 0.56 $mg/cm^2$. The curve that is closer to the x-axis at 0.6 V is for initial, and the other curve is for after 70,000 cycles.

A hybrid electrocatalyst with 0.85 mass % of Pt and 2.8 mass % of Fe and heat treated in an Ar atmosphere (denoted as Pt—Fe—N—C) was synthesized and evaluated for ORR. As shown in FIG. 2A, its steady-state polarization curve in an $O_2$-saturated 0.1 M $HClO_4$ solution is identical to that of Fe—N—C, suggesting that there is no significant improvement in the ORR activity with an extremely low Pt loading. Surprisingly, its durability upon potential cycling in the range of 0.6-1.0 V at 50 millivolts per second (mV/s) is much better than that of pristine Fe—N—C. As shown in FIG. 2B, the Pt—Fe—N—C showed no noticeable decay in the half-wave potential after 70,000 cycles. For comparison, only after 10,000 cycles the half-wave potential of Fe—N—C and Pt/C dropped by 16 and 10 mV, respectively. Thus, the introduction of a trace amount of Pt atoms did not improve the ORR activity appreciably, but it did significantly increase the stability of the electrocatalyst (compared to Fe—N—C alone).

Figures 3A, 3B, 3C, 3D:
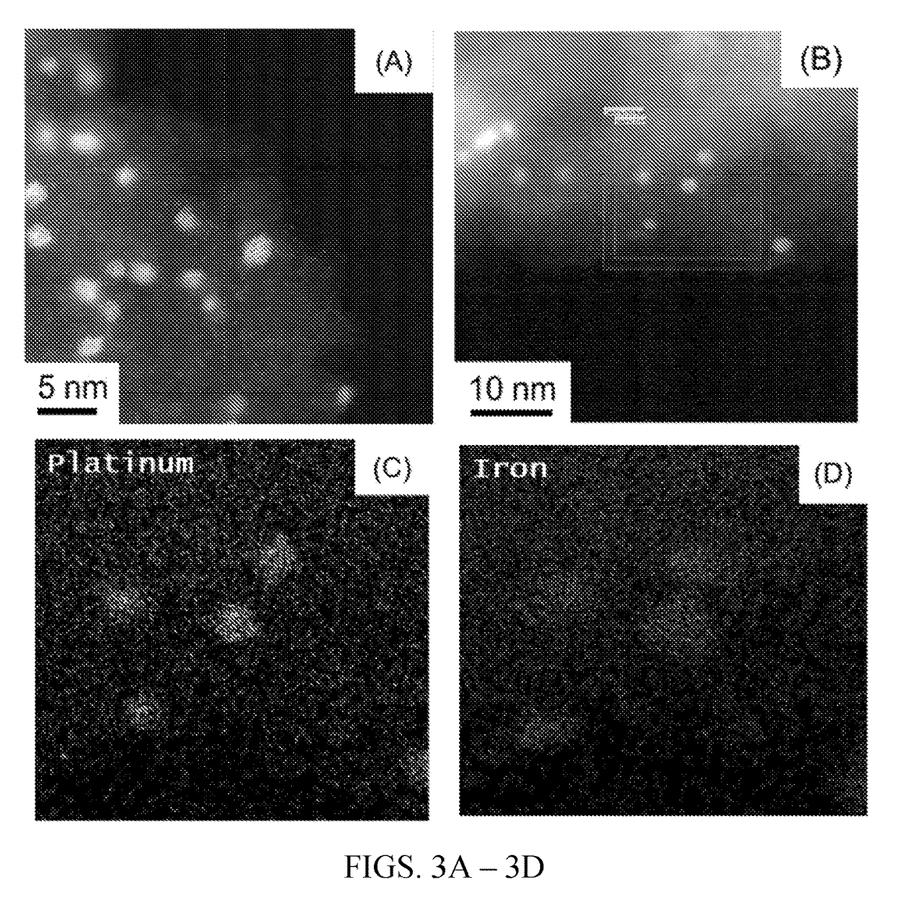
FIG. 3A is an HAADF-STEM image of a Pt—Fe—N—C catalyst showing co-existence of Pt and Fe single atoms and crystalline nanoparticles.
FIG. 3B is an HAADF-STEM image of a Pt—Fe—N—C catalyst showing co-existence of Pt and Fe single atoms and crystalline nanoparticles.
FIG. 3C is an energy-dispersive X-ray spectroscopy image for platinum for the area of FIG. 3B in the smaller inset square.
FIG. 3D is an energy-dispersive X-ray spectroscopy image for iron for the area of FIG. 3B in the larger inset square.

Referring to the HAADF-STEM images of Pt—Fe—N—C in FIGS. 3A and 3B, some Pt—Fe alloy nanoparticles still existed. Though the energy-dispersive X-ray spectroscopy mapping images for platinum (FIG. 3C) and iron (FIG. 3D) for the areas indicated in FIG. 3B as the small square and the large square, respectively, show Pt and Fe uniform distributions.

Example 3—Preparation of Pt—Fe—N—C($NH_3$) Hybrid Catalyst

It was found that $NH_3$ played an important role in increasing the ORR activity of Fe-N—C during heat treatment. In order to further improve the ORR activity of the Pt—Fe—N—C, a second heat treatment was performed in a $NH_3$ atmosphere, which can etch the carbon according to the reactions: $C+NH_3 \rightarrow HCN+H_2$, and $C+2H_2 \rightarrow CH_4$. Removing some of the carbon support will result in an increase in both the Pt and Fe loading. In addition, some active sites that are covered by a carbon film formed on the first heat treatment may be exposed after such etching. The detail synthesis steps were as follows.

- 10 mg platinum (II) acetylacetonate was homogeneously dispersed in an ethanol solvent forming a 5 mM solution by sonication.
- Then, 1,10-phenanthroline monohydrochloride monohydrate ethanol solution (5.5 g/L) was added to the Pt solution (e.g., to provide enough nitrogen source for Pt coordination).
- 400 mg Fe-ZIF-8 was dispersed in the above solution to form a uniform suspension.

After drying at 60° C. in the vacuum oven for 12 h, the solid was collected and ball milled (using an $Al_2O_3$ ball, 350 rpm, 4 h) to uniformly disperse Pt and N sources on the Fe-ZIF-8 support.

The powder after ball milling was first treated in $NH_3$ gas at 900° C. for 15 min and then a secondary heat treatment was performed in Ar atmosphere at 1000° C. for 1 h.

After heat treatment, acid washing in 0.5 M $H_2SO_4$ was performed, 60° C. for 2 h was performed, and a second heat treatment in Ar atmosphere at 1000° C. for 1 h was performed to remove Fe particles and provide a stable carbon framework, respectively. The final catalyst is denoted as Pt—Fe—N—C($NH_3$).

Figure 4A:
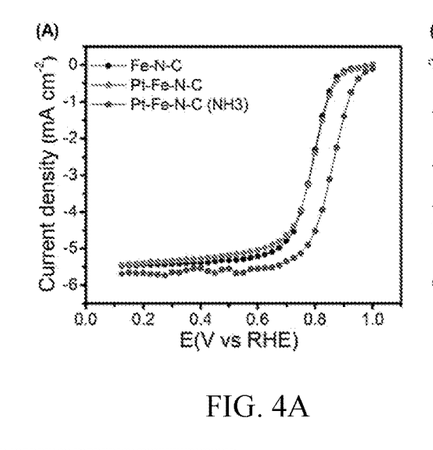
FIG. 4A is a plot of current density (in $mA/cm^2$) versus potential (in V vs RHE), providing the steady-state polarization curves of ORR activity for Fe—N—C, Pt—Fe—N—C, and Pt—Fe—N—C($NH_3$). The curve that is closest to the x-axis at 0.6 V is for Pt—Fe—N—C($NH_3$); the curve that is farthest from the x-axis at 0.6 V is for Pt—Fe—N—C; and the middle curve at 0.6 V is for Fe—N—C. The catalyst loadings were all 0.56 $mg/cm^2$.
Figure 4B:
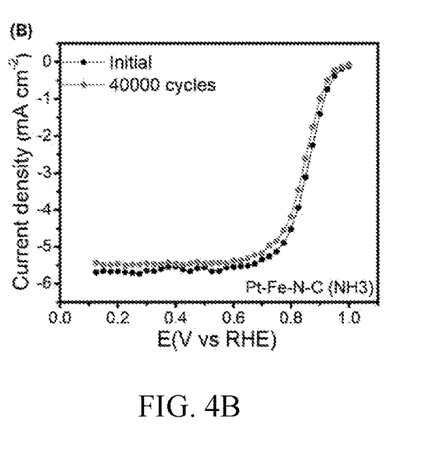
FIG. 4B is a plot of current density (in $mA/cm^2$) versus potential (in V vs RHE), providing the steady-state polarization curves of ORR activity for Pt—Fe—N—C($NH_3$) initially and after 40,000 cycles in 0.1 M $HClO_4$ electrolyte. The catalyst loadings were 0.56 $mg/cm^2$. The curve that is closer to the x-axis at 0.6 V is for initial, and the other curve is for after 40,000 cycles.

The resulting catalyst (denoted as Pt—Fe—N—C($NH_3$) showed a 3-fold increase in the Pt loadings compared with the Pt—Fe—N—C from Example 2 (3 mass % of Pt and 1.6 mass % of Fe). Referring to FIG. 4A, with the same mass on the electrode, the $NH_3$ treated sample showed a significantly improved ORR activity by shifting the half-wave potential from 0.790 V to 0.893 V. The Pt mass activity of Pt—Fe—N—C($NH_3$) at 0.9 V could reach 0.8 Amps per milligram (A/mg), which is more than four times that of commercial Pt/C (TKK, TEC10E50E, 0.18 $A/mg_{Pt}$). In addition to the high activity, the durability of Pt—Fe—N—C ($NH_3$) is also comparable to that of Pt/C. After 40,000 cycles of potential cycling in the range of 0.6-1.0 V, the change of its half-wave potential is about 15 mV (FIG. 4B), which is similar to that of Pt/C.

Figures 5A, 5B, 5C, 5D, 5E, 5F:
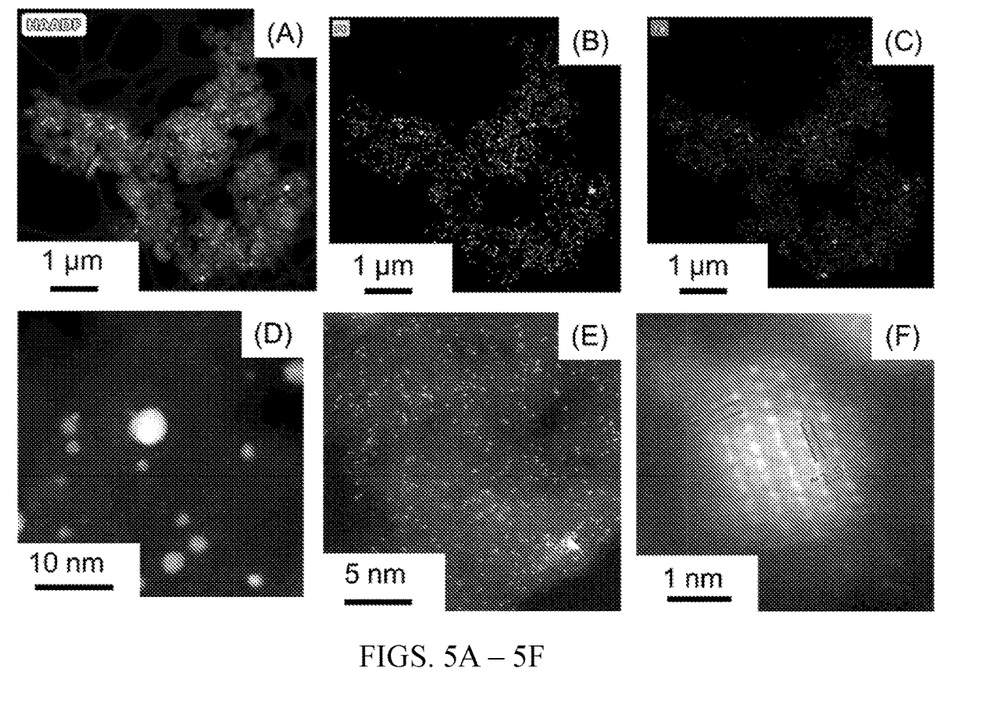
FIG. 5A is an HAADF-STEM image of a Pt—Fe—N—C($NH_3$) catalyst.
FIG. 5B is a relative energy-dispersive X-ray spectroscopy image for platinum for the catalyst of FIG. 5A.
FIG. 5C is a relative energy-dispersive X-ray spectroscopy image for iron for the catalyst of FIG. 5A.
FIG. 5D is an HAADF-STEM image of a Pt—Fe—N—C($NH_3$) catalyst showing co-existence of Pt and Fe single atoms and crystalline nanoparticles.
FIG. 5E is an HAADF-STEM image of a Pt—Fe—N—C($NH_3$) catalyst showing co-existence of Pt and Fe single atoms.
FIG. 5F is an HAADF-STEM image of a Pt—Fe—N—C($NH_3$) catalyst showing crystalline nanoparticles.

FIG. 5A is an HAADF-STEM image of the Pt—Fe—N—C($NH_3$) catalyst; FIG. 5B is a relative energy-dispersive X-ray spectroscopy image for platinum for the catalyst of FIG. 5A.; FIG. 5C is a relative energy-dispersive X-ray spectroscopy image for iron for the catalyst of FIG. 5A; and FIGS. 5D-5F are HAADF-STEM images of the Pt—Fe—N—C($NH_3$) catalyst showing co-existence of Pt and Fe single atoms and crystalline nanoparticles. Referring to FIGS. 5A-5C, Pt and Fe were homogeneously dispersed in the whole carbon framework. In addition to Pt and Fe single atoms, some Pt—Fe crystalline nanoparticles still existed (FIG. 5D). Through the lattice space of 2.6 Angstroms (Å) and 1.94 Å, the nanoparticles can be assigned to $Pt_3Fe$ (FIG. 5F).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES (1) Qiao, B.; Wang, A.; Yang, X.; Allard, L. F.; Jiang, Z.; Cui, Y.; Liu, J.; Li, J.; Zhang, T., Single-Atom Catalysis of Co Oxidation Using Pt1/Feox. Nat. Chem. 2011, 3, 634.

(2) Yang, S.; Kim, J.; Tak, Y. J.; Soon, A.; Lee, H., Single-Atom Catalyst of Platinum Supported on Titanium Nitride for Selective Electrochemical Reactions. Angew. Chem. Int. Ed. 2016, 55 (6), 2058-2062.

(3) Shen, R.; Chen, W.; Peng, Q.; Lu, S.; Zheng, L.; Cao, X.; Wang, Y.; Zhu, W.; Zhang, J.; Zhuang, Z., High-Concentration Single Atomic Pt Sites on Hollow Cusx for Selective $O_2$ Reduction to $H_2O_2$ in Acid Solution. Chem 2019.

(4) Cheng, N.; Stambula, S.; Wang, D.; Banis, M. N.; Liu, J.; Riese, A.; Xiao, B.; Li, R.; Sham, T.-K.; Liu, L.-M., Platinum Single-Atom and Cluster Catalysis of the Hydrogen Evolution Reaction. Nat. Commun. 2016, 7, 13638.

(5) Zhang, Z.; Chen, Y.; Zhou, L.; Chen, C.; Han, Z.; Zhang, B.; Wu, Q.; Yang, L.; Du, L.; Bu, Y., The Simplest Construction of Single-Site Catalysts by the Synergism of Micropore Trapping and Nitrogen Anchoring. Nat. Commun. 2019, 10 (1), 1657.

(6) Liu, J.; Jiao, M.; Lu, L.; Barkholtz, H. M.; Li, Y.; Wang, Y.; Jiang, L.; Wu, Z.; Liu, D.-j.; Zhuang, L., High Performance Platinum Single Atom Electrocatalyst for Oxygen Reduction Reaction. Nat. Commun. 2017, 8, 15938.

(7) Li, T.; Liu, J.; Song, Y.; Wang, F., Photochemical Solid-Phase Synthesis of Platinum Single Atoms on Nitrogen-Doped Carbon with High Loading as Bifunctional Catalysts for Hydrogen Evolution and Oxygen Reduction Reactions. ACS Catal. 2018, 8 (9), 8450-8458.

(8) Choi, C. H.; Kim, M.; Kwon, H. C.; Cho, S. J.; Yun, S.; Kim, H.-T.; Mayrhofer, K. J.; Kim, H.; Choi, M., Tuning Selectivity of Electrochemical Reactions by Atomically Dispersed Platinum Catalyst. Nat. Commun. 2016, 7, 10922.

(9) Meng, H.; Larouche, N.; Lefèvre, M.; Jaouen, F.; Stansfield, B.; Dodelet, J.-P., Iron Porphyrin-Based Cathode Catalysts for Polymer Electrolyte Membrane Fuel Cells: Effect of Nh3 and Ar Mixtures as Pyrolysis Gases on Catalytic Activity and Stability. Electrochimica Acta 2010, 55 (22), 6450-6461.

(10) Charreteur, F.; Jaouen, F.; Dodelet, J.-P., Iron Porphyrin-Based Cathode Catalysts for Pem Fuel Cells: Influence of Pyrolysis Gas on Activity and Stability. Electrochimica Acta 2009, 54 (26), 6622-6630.

(11) Eric Proietti, et al. "Catalysts made using thermally decomposable porous supports." U.S. Patent Application Publication No. U.S. 2014/0099571 A1.

(12) Michel Lefevre, et al. "Catalyst precursors, catalysts and methods of producing same." U.S. Patent Application Publication No. U.S. 2011/0294658 A1.

(13) Piotr Zelenay, et al. "Nitrogen-doped carbon-supported cobalt-iron oxygen reduction catalysts." U.S. Patent No. U.S. Pat. No. 8,709,295 B2.

What is claimed is:

1. A fuel cell electrocatalyst, comprising:
   a support comprising carbon;
   a plurality of atoms of a first catalyst uniformly dispersed in a framework of the support such that each atom of the first catalyst within the framework is isolated from each other atom of the first catalyst within the framework; and
   a plurality of atoms of a second catalyst uniformly dispersed in the framework of the support such that each atom of the second catalyst within the framework is isolated from each other atom of the second catalyst within the framework,
   wherein the first catalyst is a non-precious metal,
   wherein the second catalyst is a precious metal, and
   wherein the fuel cell electrocatalyst further comprises nanoparticles of an alloy of the first catalyst and the second catalyst.

2. The fuel cell electrocatalyst according to claim 1, wherein the second catalyst is platinum (Pt).

3. The fuel cell electrocatalyst according to claim 1, wherein the first catalyst is iron (Fe), cobalt (Co), or manganese (Mn).

4. The fuel cell electrocatalyst according to claim 1, wherein the second catalyst is present in an amount of 0.1 milligrams per square centimeter ($mg/cm^2$) or lower.

5. A fuel cell electrocatalyst, comprising:
a support comprising carbon;
a plurality of atoms of a first catalyst uniformly dispersed in a framework of the support such that each atom of the first catalyst within the framework is isolated from each other atom of the first catalyst within the framework; and
a plurality of atoms of a second catalyst uniformly dispersed in the framework of the support such that each atom of the second catalyst within the framework is isolated from each other atom of the second catalyst within the framework,
wherein the first catalyst is a non-precious metal,
wherein the second catalyst is a precious metal,
wherein the carbon of the support is doped with nitrogen (N), such that N atoms are present within the framework of the support,
wherein at least a portion of the plurality of atoms of the first catalyst within the framework are respectively bonded to N atoms within the framework, and
wherein at least a portion of the plurality of atoms of the second catalyst within the framework are respectively bonded to N atoms within the framework.

6. A method of forming a fuel cell electrocatalyst, the method comprising:
forming a porous support comprising carbon and a first catalyst; and
introducing a second catalyst to the porous support to form the fuel cell electrocatalyst, such that a plurality of atoms of the second catalyst are uniformly dispersed in a framework of the support such that each atom of the second catalyst within the framework is isolated from each other atom of the second catalyst within the framework,
wherein the first catalyst is a non-precious metal,
wherein the second catalyst is a precious metal, and
wherein the formed fuel cell electrocatalyst comprises nanoparticles of an alloy of the first catalyst and the second catalyst.

7. The method according to claim 6,
wherein the second catalyst is platinum (Pt).

8. The method according to claim 6,
wherein the first catalyst is iron (Fe), cobalt (Co), or manganese (Mn).

9. The method according to claim 6,
wherein, in the formed fuel cell electrocatalyst, a plurality of atoms of the first catalyst are uniformly dispersed in the framework of the support such that each atom of the first catalyst within the framework is isolated from each other atom of the first catalyst within the framework.

10. The method according to claim 6,
wherein the carbon of the support is doped with nitrogen (N), such that N atoms are present within the framework of the support,
wherein, in the formed fuel cell electrocatalyst, a plurality of atoms of the first catalyst are uniformly dispersed in the framework of the support such that each atom of the first catalyst within the framework is isolated from each other atom of the first catalyst within the framework,
wherein at least a portion of the plurality of atoms of the first catalyst within the framework are respectively bonded to N atoms within the framework, and
wherein at least a portion of the plurality of atoms of the second catalyst within the framework are respectively bonded to N atoms within the framework.

11. The method according to claim 6, wherein the formed fuel cell electrocatalyst comprises the second catalyst in an amount of 0.1 milligrams per square centimeter ($mg/cm^2$) or lower.

12. The method according to claim 6, wherein forming the porous support comprises using a metal organic framework (MOF) as a template for the support.

13. The method according to claim 6, wherein forming the porous support comprises:
dissolving an organic compound in a first solvent to form a first solution;
dissolving a compound having the first catalyst in a second solvent to form a second solution;
mixing the first solution and the second solution to form a first mixture;
stirring the first mixture to form a suspension;
collecting the suspension;
drying the suspension to give a dried suspension; and
heat-treating the dried suspension to give the porous support.

14. The method according to claim 13, wherein the first solvent is the same as the second solvent,
wherein drying the suspension comprises drying the suspension in a vacuum atmosphere,
wherein heat-treating the dried suspension comprises heat-treating the dried suspension in an inert atmosphere,
wherein collecting the suspension comprises collecting the suspension by centrifuging,
wherein mixing the first solution and the second solution comprises mixing the first solution and the second solution in an inert atmosphere,
wherein stirring the first mixture comprises stirring the first mixture in an inert atmosphere, and
wherein the method further comprises, after collecting the suspension, washing the suspension with a third solvent at least one time before drying the suspension.

15. The method according to claim 6, wherein introducing the second catalyst to the porous support to form the fuel cell electrocatalyst comprises:
homogeneously dispersing a second-catalyst-containing material in a fourth solvent to form a third solution;
adding a fourth solution to the third solution to form a fifth solution;
adding the porous support to the fifth solution to form a second-catalyst-containing suspension;
drying the second-catalyst-containing suspension to give a dried second-catalyst-containing suspension;
ball milling the dried second-catalyst-containing suspension to give a milled second-catalyst-containing suspension; and
heat-treating the milled second-catalyst-containing suspension to give the fuel cell electrocatalyst.

16. The method according to claim 15, wherein the fourth solution is a nitrogen-containing solution,
wherein drying the second-catalyst-containing suspension comprises drying the second-catalyst-containing suspension in a vacuum atmosphere, wherein heat-treating the milled second-catalyst-containing suspension comprises heat-treating the milled second-catalyst-containing suspension in an inert atmosphere, wherein ball milling the dried second-catalyst-containing suspension comprises ball milling the dried second-catalyst-containing suspension with an aluminum-containing ball, and wherein heat-treating the milled second-catalyst-containing suspension comprises:

performing a first heat treatment on the milled second-catalyst-containing suspension in an $NH_3$ atmosphere;

performing a second heat treatment on the milled second-catalyst-containing suspension in an inert atmosphere after the first heat treatment;

performing a washing step on the milled second-catalyst-containing suspension after the second heat treatment; and performing a third heat treatment on the milled second-catalyst-containing suspension in an inert atmosphere after the washing step.

17. The method according to claim 16, wherein the ball is an $Al_2O_3$ ball.

18. The method according to claim 16, wherein the washing step comprises washing the milled second-catalyst-containing suspension with an acid.

* * * * *